US012578251B2

(12) United States Patent
Pocha Siva Sankara et al.

(10) Patent No.: US 12,578,251 B2
(45) Date of Patent: Mar. 17, 2026

(54) ENGINE HEALTH MONITORING SYSTEM

(71) Applicant: Progress Rail Locomotive Inc., LaGrange, IL (US)

(72) Inventors: Reddy Pocha Siva Sankara, Naperville, IL (US); Jaldeep N. Kansara, Bolingbrook, IL (US); Michael B. Goetzke, Orland Park, IL (US)

(73) Assignee: Progress Rail Locomotive Inc., LaGrange, IL (US)

( * ) Notice: Subject to any disclaimer, the term of this patent is extended or adjusted under 35 U.S.C. 154(b) by 202 days.

(21) Appl. No.: 18/379,461

(22) Filed: Oct. 12, 2023

(65) Prior Publication Data

US 2025/0123183 A1 Apr. 17, 2025

(51) Int. Cl.
 *G01M 15/04* (2006.01)
 *B61L 15/00* (2006.01)
(52) U.S. Cl.
 CPC ........... *G01M 15/048* (2013.01); *B61L 15/00* (2013.01)
(58) Field of Classification Search
 CPC ...... F02D 35/00; F02D 41/00; F02D 41/0007; F02D 41/021; F02D 23/00; F02D 29/02; F02D 31/007; F02D 41/0002; F02D 41/024; F02D 13/0215; F02D 13/0269; F02D 41/029; F02C 9/16; F02B 41/10; F02B 37/004; F02B 37/00; F02B 37/18; F02B 37/24; F02B 77/082; F02B 29/083; F02B 29/00; F02B 29/08; F02B 29/0406; F01N 5/00; F01N 5/04; F01N 9/00; F01N 2260/14; F01N 2410/00; F01N 2900/08; F01N 2900/10; F01N 2900/1406; F05D 2220/40; F05D 2270/301; Y02T 10/12; Y02T 10/40; B60H 1/3208; B60H 1/00771; B60H 1/00; B60H 1/00642;
(Continued)

(56) References Cited

U.S. PATENT DOCUMENTS 4,122,720 A 10/1978 Podl
6,675,639 B1 1/2004 Schricker
(Continued)

FOREIGN PATENT DOCUMENTS

CN 109187038 B 7/2019
CN 111337070 A * 6/2020 ............. G01D 21/02
WO WO-0214657 A1 * 2/2002 ............. F01N 3/023

*Primary Examiner* — Brian A Zimmerman
*Assistant Examiner* — Anthony D Afrifa-Kyei

(57) ABSTRACT

A health monitoring system for a prime mover of a locomotive is disclosed. The health monitoring system comprises: the prime mover having a cylinder head with a first bank and a second bank; an EGR cooler; a turbocharger; a first temperature sensor provided on a first exhaust and a second temperature sensor provided on a second exhaust; a barometric pressure sensor; a controller in communication with the first temperature sensor, the second temperature sensor, and the barometric pressure sensor, the controller configured to: monitor a temperature relationship between the first temperature sensor and the second temperature sensor in real time at varying altitudes and atmospheres; detect instances of temperature differentials during operation; and identify an operational issue when instances of temperature differentials exceeds a temperature differential limit.

20 Claims, 6 Drawing Sheets

(58) Field of Classification Search
CPC ............ B60H 1/00735; B60H 1/00764; B60H
1/3222; B60H 1/3232; B60P 3/20; F25B
49/022; F25B 49/025; F02M 26/23;
F02M 26/28; F02M 26/32; F02M 26/15;
F02M 26/05; F02M 26/10; F01P 7/14;
F01P 7/167; F01P 3/02; F01P 5/12; F01P
7/165; F01P 2003/024; F01P 2007/146;
F01P 7/00; F01P 2050/30; F01P
2060/045; F01P 2060/16; B60K 11/02;
F02F 1/40; F28D 21/0003; F28D 7/16;
F28D 7/00; F28D 7/1607; F28D 7/1615;
F28D 7/163; F28D 7/1684; F28F
2009/222; F28F 2225/04; F28F 2270/00;
B61C 9/24; B61C 9/00; B61C 9/08
See application file for complete search history.

(56) References Cited

U.S. PATENT DOCUMENTS

| | | | | |
|---|---|---|---|---|
| 8,943,804 | B2 | 2/2015 | Schreurs | |
| 9,488,132 | B2 * | 11/2016 | Khanapure | .......... F02M 53/043 |
| 2015/0196877 | A1 * | 7/2015 | Golin | .................... F01N 3/2066 |
| | | | | 422/109 |
| 2017/0089278 | A1 * | 3/2017 | Tulapurkar | ........... F02D 35/027 |
| 2017/0306915 | A1 * | 10/2017 | Karunaratne | ........ F02D 41/221 |

* cited by examiner

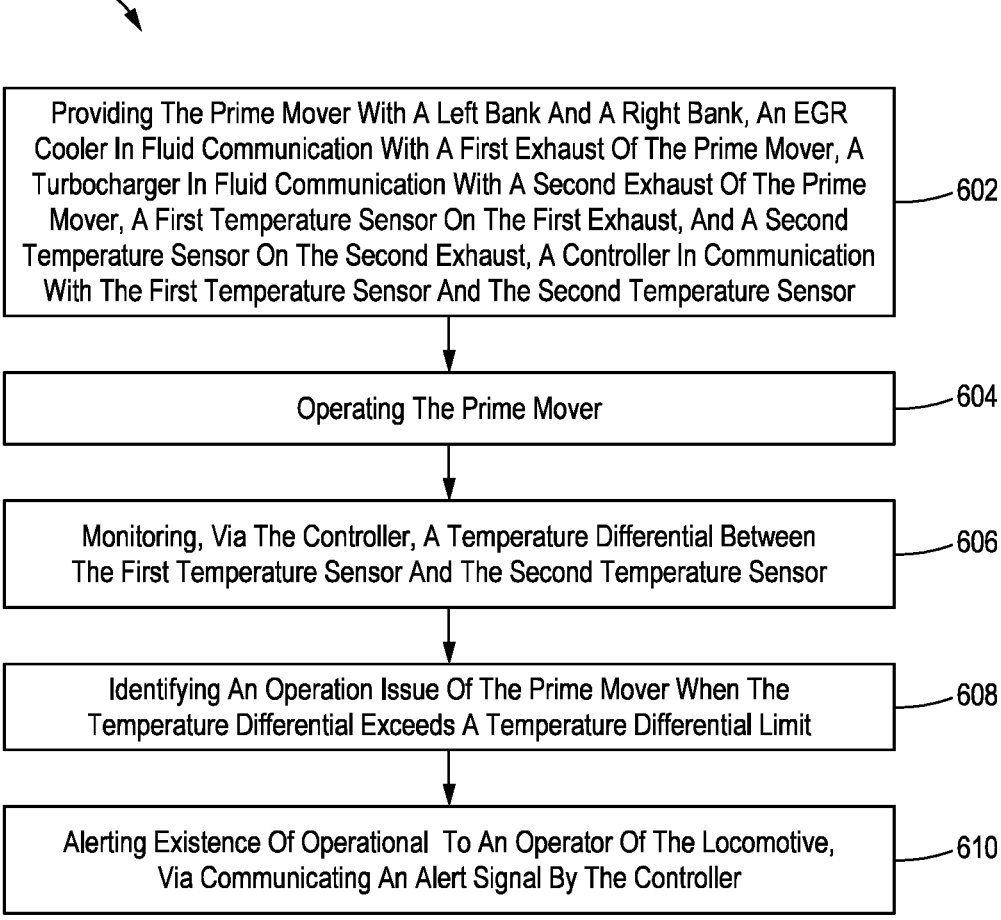

600

Providing The Prime Mover With A Left Bank And A Right Bank, An EGR Cooler In Fluid Communication With A First Exhaust Of The Prime Mover, A Turbocharger In Fluid Communication With A Second Exhaust Of The Prime Mover, A First Temperature Sensor On The First Exhaust, And A Second Temperature Sensor On The Second Exhaust, A Controller In Communication With The First Temperature Sensor And The Second Temperature Sensor — 602

Operating The Prime Mover — 604

Monitoring, Via The Controller, A Temperature Differential Between The First Temperature Sensor And The Second Temperature Sensor — 606

Identifying An Operation Issue Of The Prime Mover When The Temperature Differential Exceeds A Temperature Differential Limit — 608

Alerting Existence Of Operational  To An Operator Of The Locomotive, Via Communicating An Alert Signal By The Controller — 610

*FIG. 6*

ENGINE HEALTH MONITORING SYSTEM

TECHNICAL FIELD

The present disclosure generally relates to locomotive engines, and more particularly relates to health monitoring systems of locomotive engines.

BACKGROUND

Engines for locomotives, such as trains and marine vessels, play a critical role in the transportation industry, powering locomotives that haul heavy loads over long distances. These engines consist of numerous components, including cylinder heads, combustion chambers, and valve mechanisms, among others.

Monitoring of engine health during operation for early detection of operational issues allows preventing escalation of engine issues. Tools and methodologies that facilitate real-time detection of operational issues for engines of locomotives helps further prevent costly downtimes, ensuring efficient operation, and extending the service life of diesel engines. Generally, a variety of sensors are provided in the engine for monitoring various operational parameters of engines such as temperature and pressure.

However, others have attempted to improve the detection of engine health monitoring but have failed to consider temperatures of exhaust in real-time at varying altitudes of locomotives. For example, U.S. Pat. No. 6,675,639 discloses a method for detecting cylinder faults by collecting temperature data representative of temperatures of exhaust from the cylinder of a cylinder head and estimates the temperatures of the exhaust as a function of the collected temperature data to determine at least one severity symptom of an internal combustion engine.

Hence, there exists a need for an engine health monitoring system for a prime mover that monitor exhaust gas temperature in real time at varying altitudes of a locomotive for earlier detection of operation issues of the prime mover for minimizing maintenance costs, and downtime.

SUMMARY

In accordance with one aspect of the disclosure, a health monitoring system for a prime mover of a locomotive is disclosed. The health monitoring system comprises: the prime mover having a cylinder head with a first bank and a second bank; an EGR cooler in fluid communication with the prime mover; a first exhaust of the prime mover in fluid communication with the EGR cooler; a turbocharger in fluid communication with the prime mover; a second exhaust of the prime mover in fluid communication with the turbocharger; a first temperature sensor provided on the first exhaust and a second temperature sensor provided on the second exhaust; a barometric pressure sensor provided on the prime mover; a controller in communication with the first temperature sensor, the second temperature sensor, and the barometric pressure sensor. The controller is configured to: monitor a temperature relationship between the first temperature sensor and the second temperature sensor in real time at varying altitudes and atmospheres; detect instances of temperature differentials of the temperature relationship during operation of the prime mover; and identify an operational issue of the prime mover when instances of temperature differentials exceeds a temperature differential limit.

In accordance with another aspect of the disclosure, a locomotive is disclosed comprising: a frame; a prime mover mounted on the frame; a ground engaging element supporting the frame; a cab; a turbocharger the prime mover having a cylinder head with a first bank and a second bank; an EGR cooler in fluid communication with the prime mover; a first exhaust of the prime mover in fluid communication with the EGR cooler; the turbocharger in fluid communication with the prime mover; a second exhaust of the prime mover in fluid communication with the turbocharger a health monitoring system including: a first temperature sensor provided on the first exhaust and a second temperature sensor provided on the second exhaust; a barometric pressure sensor provided on the prime mover; and a controller in communication with the first temperature sensor, the second temperature sensor, and the barometric pressure sensor. The controller is configured to: monitor a temperature relationship between the first temperature sensor and the second temperature sensor in real time at varying altitudes and atmospheres; detect instances of temperature differentials of the temperature relationship during operation of the prime mover; and identify an operational issue of the prime mover when instances of temperature differentials exceeds a temperature differential limit.

In accordance with another aspect of the disclosure, a method for monitoring the health status of a prime mover of a locomotive is disclosed. The method comprises: providing the prime mover with a left bank and a right bank, an EGR cooler in fluid communication with a first exhaust of the prime mover, a turbocharger in fluid communication with a second exhaust of the prime mover, a first temperature sensor on the first exhaust, and a second temperature sensor on the second exhaust, a controller in communication with the first temperature sensor and the second temperature sensor; operating the prime mover; monitoring, via the controller, a differential between the first temperature sensor and the second temperature sensor; identifying the differential exceeding a threshold; and alerting existence of an operational issue, via communicating an alert signal by the controller.

These and other aspects and features of the present disclosure will be better understood upon reading the following detailed description when read in conjunction with the accompanying drawings.

BRIEF DESCRIPTION OF THE DRAWINGS

FIG. 6 is a flow-chart of a method of monitoring health of the prime mover of FIG. 2, according to an embodiment of the present disclosure.

Figure 1:
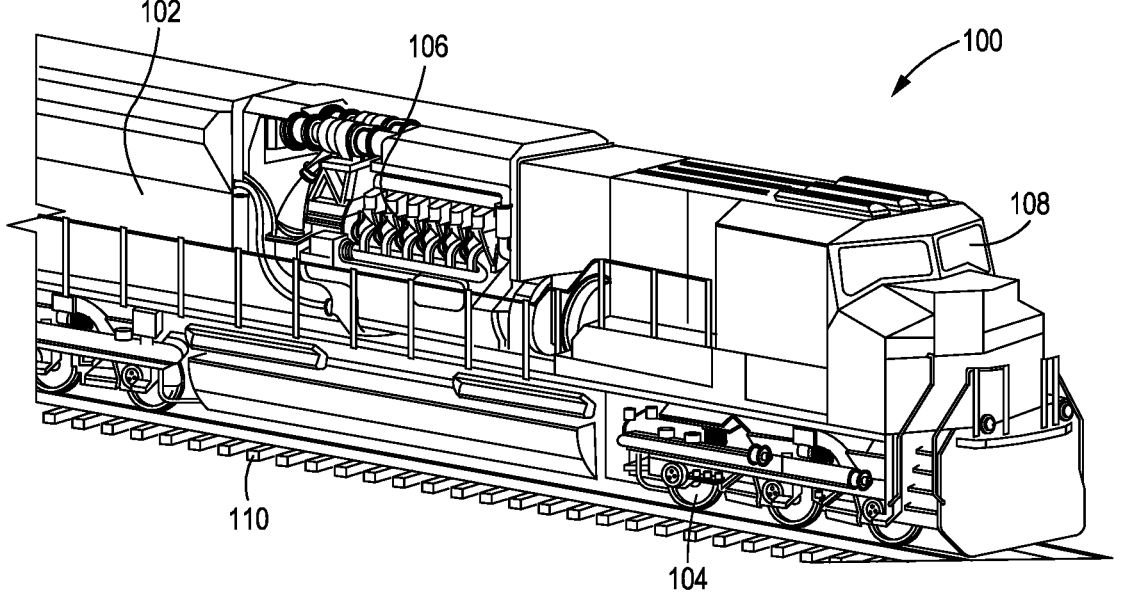
FIG. 1 is a perspective view of a locomotive, according to an embodiment of the present disclosure.

The figures depict one embodiment of the presented disclosure for purposes of illustration only. One skilled in the art will readily recognize from the following discussion that alternative embodiments of the structures and methods illustrated herein may be employed without departing from the principles described herein.

DETAILED DESCRIPTION

Referring now to the drawings, and with specific reference to the depicted example, a locomotive 100 is shown, illustrated as an exemplary train. While the following detailed description describes an exemplary aspect in connection with the train, it should be appreciated that the description applies equally to the use of the present disclosure in other locomotives, including, but not limited to, work machines, excavators, marine vessels, boats, backhoes, front-end loaders, shovels, draglines, skid steers, wheel loaders, and tractors, as well.

Referring now to FIG. 1, the locomotive 100 comprises a frame 102. The frame 102 is supported on ground engaging elements 104, illustrated as continuous tracks. It should be contemplated that the ground engaging elements 104 may be any other type of ground engaging elements 104 such as, for example, wheels, etc. The locomotive 100 further includes a prime mover 106 in the frame 102, and a cab 108 for operator personnel to operate the locomotive 100.

The prime mover 106 may be a diesel or gasoline internal combustion engine serving as the primary source of locomotive power, as generally known in the arts. The prime mover 106 may use diesel or gasoline as fuel. The prime mover 106 converts fuel and air into mechanical energy, propelling the locomotive 100 and facilitating its movement along railway tracks 110. One or more railcars may be coupled with the locomotive 100 for carrying passengers or goods along the railway tracks 110.

Figure 2:
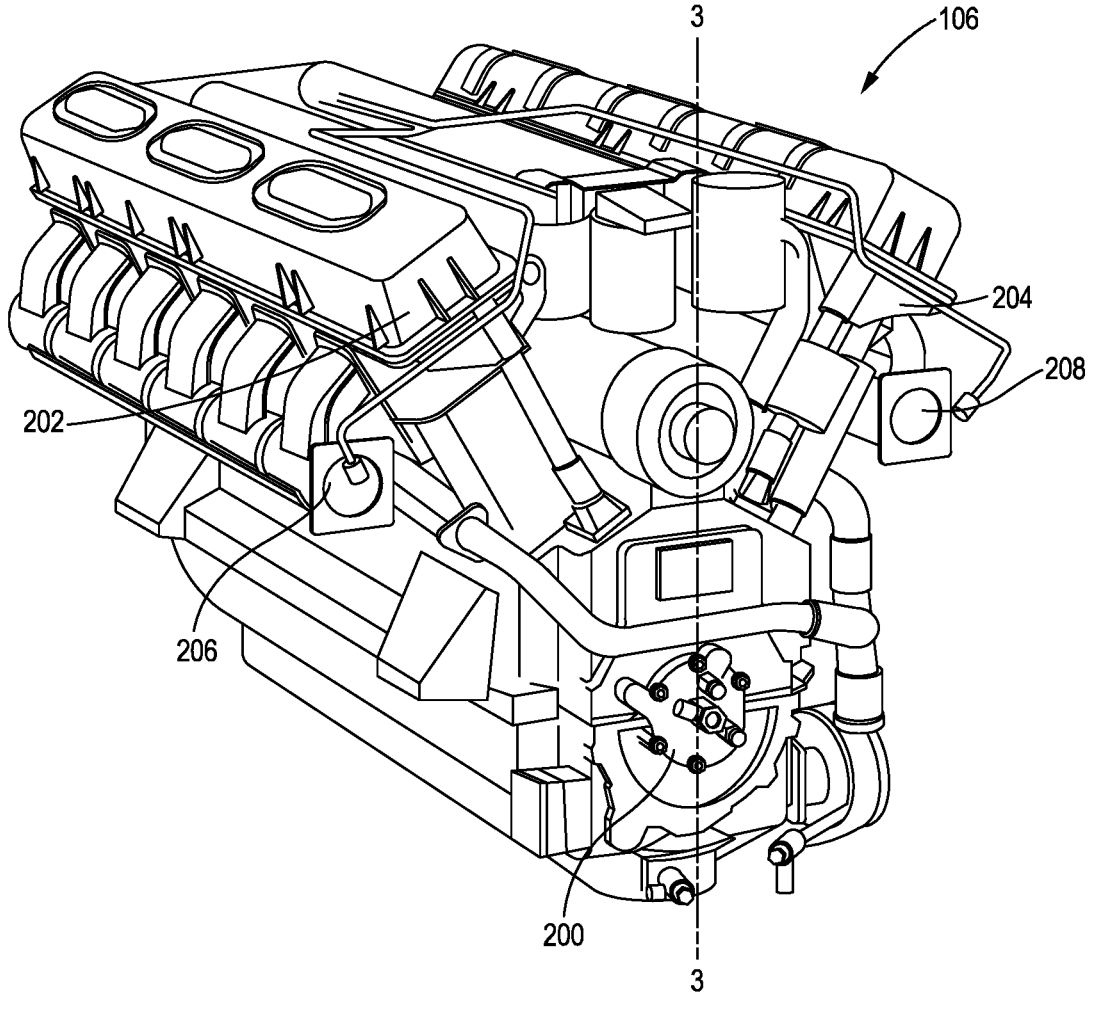
FIG. 2 is a perspective view of a prime mover of the locomotive of FIG. 1, according to an embodiment of the present disclosure.

Now referring to FIG. 2, FIG. 2 illustrates the prime mover 106 as a multi-bank diesel engine, which serves as the primary power source for the locomotive 100, according to one embodiment of the disclosure. The prime mover 106 may be a diesel V12 ESG combustion engine, or another internal combustion engine as generally known in the arts. The use of a diesel V12 combustion engine as the prime mover 106 may provide the locomotive 100 with required necessary power and torque to handle various loads and terrains.

The prime mover 106 may include an engine block 200, a left bank 202, a right bank 204, an air intake system 206, and an exhaust system 208. The engine block 200 serves as the foundation of the prime mover 106, housing where the fuel and air mixture undergoes the combustion process. It provides structural integrity and support for various engine components, ensuring the engine's durability and efficient operation. The combustion chamber 306 is where the fuel and air mixture ignites, generating high-pressure gases that exert force on the pistons, converting the thermal energy into mechanical work to drive the ground engaging elements 104 of the locomotive 100. The design and configuration of the combustion chamber 306 may influence the engine's performance characteristics, such as power output, fuel efficiency, and emissions control. The combustion chamber 306 may be provided on the prime mover 106 in a right bank 204 and a left bank 202, as generally known in the arts.

The air intake system 206 and exhaust system 208 work in conjunction to manage the flow of air and exhaust gases within the prime mover 106 to ensure that the prime mover 106 receives a sufficient and controlled amount of air for combustion, while the exhaust system 208 is responsible for expelling emissions, such as carbon dioxide.

Figure 3:
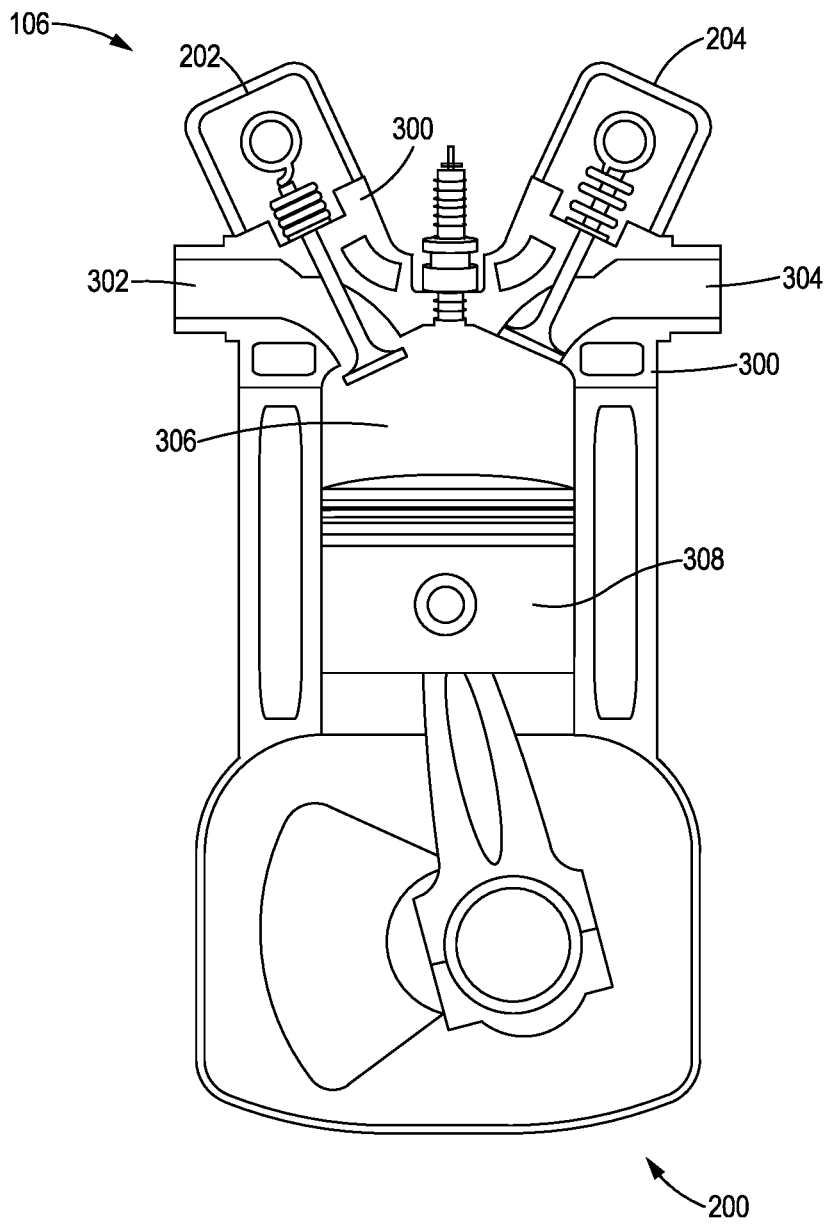
FIG. 3 is a cross-sectional view of the prime mover, taken along line 3-3 of FIG. 2, according to an embodiment of the present disclosure.

Now referring to FIG. 3, a cross-section of the prime mover 106 of FIG. 2 is illustrated, according to one embodiment of the disclosure. The prime mover 106 has a cylinder head 300 associated with the left bank 202 and the right bank 204. The prime mover 106 may be provided with an air intake flow 302 associated with the air intake system 206 and an exhaust exit flow 304 associate with the exhaust system 208. The air intake flow 302 and exhaust exit flow 304 may be fluidly connected to a combustion chamber 306 of the prime mover 106. The prime mover 106 may be further provided with a piston 308, as generally known in the arts.

Figure 4:
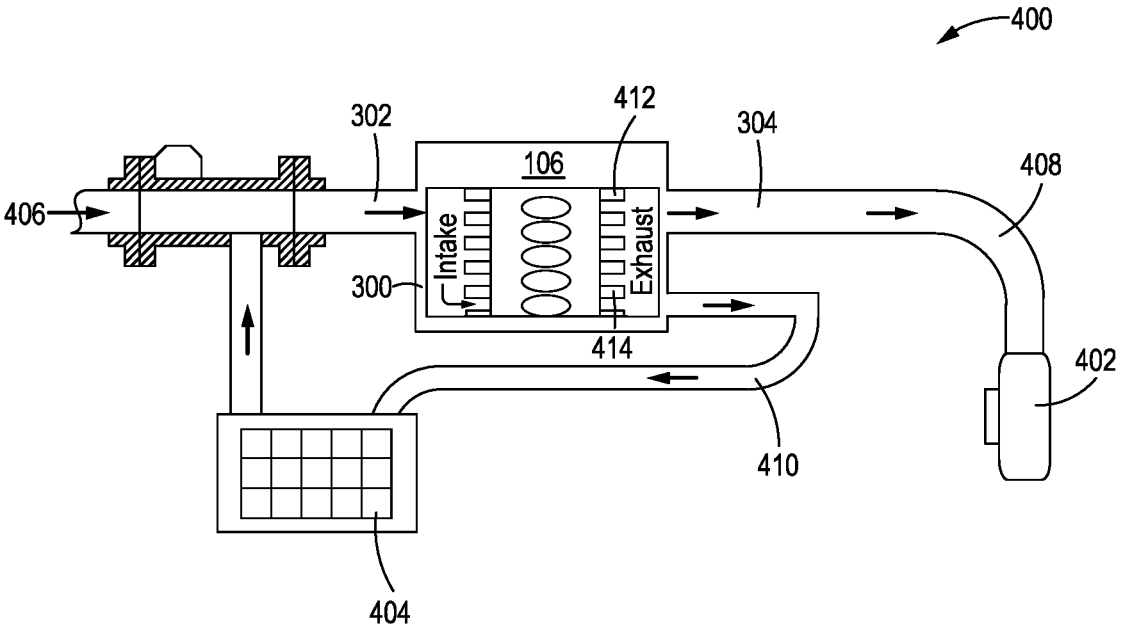
FIG. 4 is a flow diagram of an exhaust flow of the prime mover of FIG. 2, according to one embodiment of the disclosure.

Now referring to FIG. 4, a flow diagram of an exhaust flow system 400 of the prime mover 106 of FIG. 2 is illustrated, according to one embodiment of the disclosure. The exhaust flow system 400 may be provided with a turbocharger 402 and an EGR cooler 404 (exhaust gas recirculation). A fuel air mixture 406 may be provided to the prime mover 106, via the air intake flow 302 for combustion in the combustion chamber 306, as generally known in the arts. After combustion, exhaust emissions, released from the combustion process of the fuel air mixture 406, exit the exhaust exit flow 304. The exhaust may flow to the turbocharger 402, via a turbocharger fluid line 408, and to the EGR Cooler 404, via a cooler fluid line 410.

Figure 5:
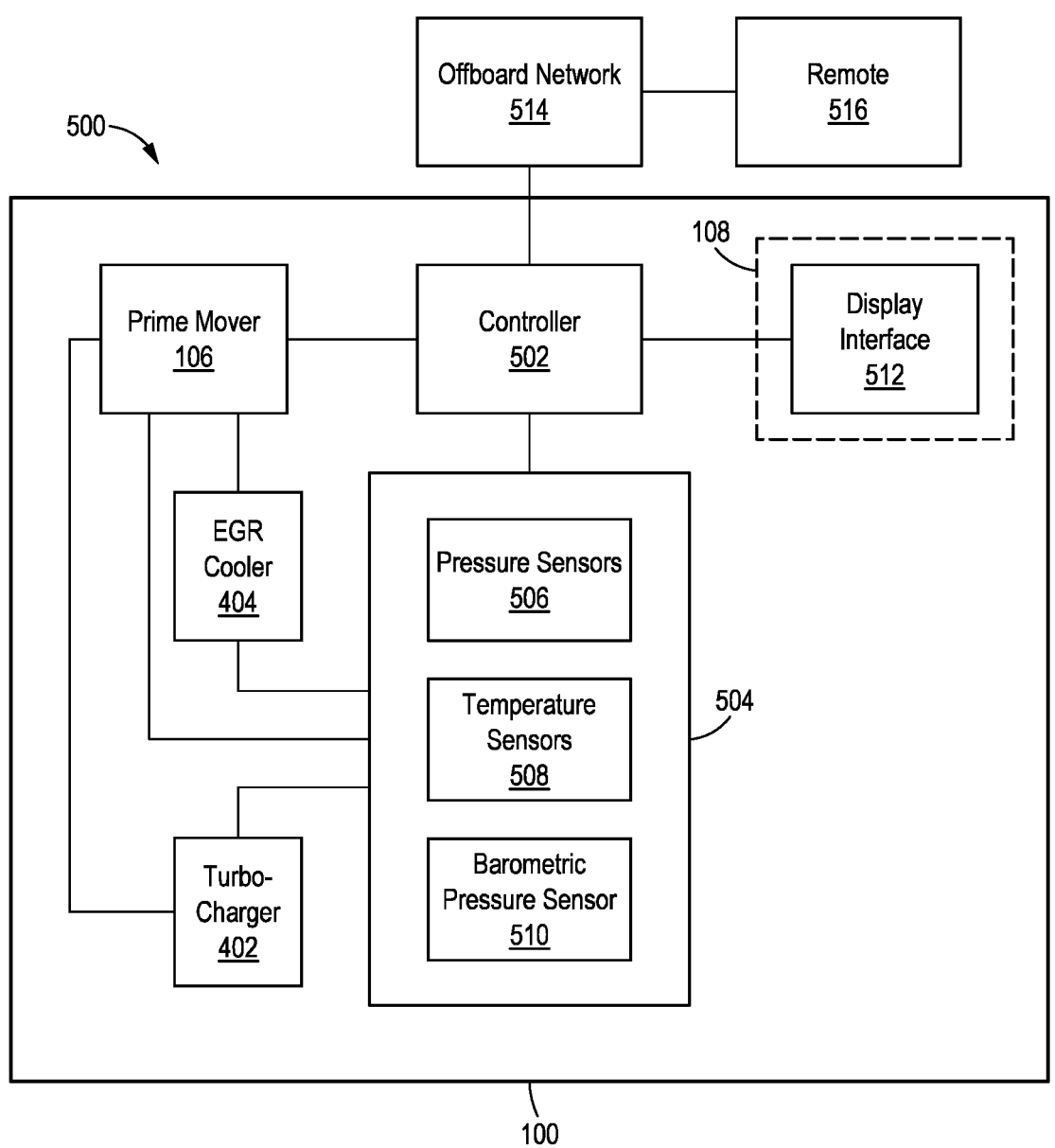
FIG. 5 is a schematic diagram of an engine health system of the prime mover of FIG. 2, according to an embodiment of the present disclosure.

Now referring to FIG. 5, a block diagram of a health monitoring system 500 for detecting operational issues of the prime mover 106 is illustrated, according to one embodiment of the disclosure. The health monitoring system 500 allows for early detection and classification of problematic operating conditions to prevent severe damage to the prime mover 106 ensuring its safe and reliable operation throughout its operational life. The health monitoring system 500 includes the prime mover 106, a controller 502, and a sensor assembly 504 having a pressure sensor 506, a temperature sensor 508, and a barometric pressure sensor 510. The controller 502 may also be in communication with a display interface 512.

The controller 502 may be further connected to an off-board network 514, allowing for the deployment of software updates and enhancements to improve the performance of the health monitoring system 500 and to facilitate remote-control operations. To facilitate remote-control and oversight, operators may utilize a remote 516 to communicate with the controller 502 through the off-board network 514. The remote 516 enables operators to control, activate, or deactivate specific operational systems promptly in response to potential crack alerts, ensuring continued safe operation of the locomotive 100.

The health monitoring system 500 may enable early detection of operating issues with the prime mover 106, such as cracks within the cylinder head 300 of the prime mover 106. The prime mover 106 undergoes cyclic thermal and mechanical stresses during its operation, making it susceptible to crack formation. The health monitoring system 500 includes a controller 502 that is component responsible for processing data and detection operations. The controller 502 interfaces with the sensor assembly 504, the pressure sensors 506, the temperature sensor 508, and the barometric pressure sensor 510.

The pressure sensor 506 may be provided to monitor the pressure variations within the prime mover 106, such as the combustion chamber 306 during operation. An increase or fluctuation in pressure levels can indicate the presence of cracks, and the pressure sensor 506 efficiently captures this critical data.

The temperature sensor 508 monitors the temperature changes within the cylinder head 300. Elevated or abnormal temperatures can be indicative problems in the prime mover 106 of crack-induced thermal inefficiencies. The temperature sensor 508 communicates temperature data to the controller 502.

The barometric sensor 510 may be provided in the locomotive 100. The barometric sensor 510 may monitor and measure atmospheric pressure changes in the immediate environment of the locomotive 100 for optimizing engine performance, enhancing fuel efficiency, and aiding in altitude adjustments. Integrating the barometric sensor 510 into the locomotive 100's control systems allows for real-time adjustments, ensuring optimal performance and safety across a range of operating conditions. Altitude readings provided by the barometric sensor 510 may aid in the determination of optimal operation of the prime mover 106 through areas with varying elevations. Altitude readings provided by the barometric sensor 510 may be communicated to the controller 502.

The sensor assembly 504 collaborates with the controller 502, which processes the sensor data to detect operational issues with the prime mover 106. The controller 502 processes various parameters, barometric pressures altitude and atmosphere, temperatures of the prime mover 106 to detect operational issues with the prime mover 106, such as cracks in the cylinder head 300. Early detection of cracks in the cylinder head 300, either left bank 202 or right bank 204, allows for immediate service and avoidance of continued operation preventing further damage.

The controller 502 in the locomotive 100 may control one or more operational systems associated with the locomotive 100. The operational systems may be one of many operating systems found within a locomotive 100 such as an ignition system, a fuel injection system, an oil transport system, a transmission, a throttle system, a power system, a braking system, a cooling system, a navigation system, a lighting system, an alarm system, a battery system, and/or an engine or other propulsion system, as generally known in the arts. These systems may also include one or more hydraulic, mechanical, electronic, and software-based components in which the controller 502 may communicate with and control, as generally known in the arts.

The health monitoring system 500 allows for early detection and classification of problematic operating conditions to prevent severe damage to the prime mover 106 ensuring its safe and reliable operation throughout its operational life. The health monitoring system 500 may detect operating issues in the cylinder head 300, and may further classify the location of the issue in the left bank 202 or the right bank 204.

The temperature sensor 508 may be provided as a plurality of thermocouples with fast sampling data, as generally known in the arts. The thermocouples may be provided throughout the exhaust flow system 400 to measure the temperature of the exhaust entering the turbocharger 402 and the temperature of the exhaust entering the the EGR cooler 404.

The temperature of the exhaust that is entering the EGR cooler 404 is from the donor bank cylinders, and similarly, the temperature of the exhaust that is entering the turbocharger 402 is mostly from the standard bank. When the prime mover 106 is in a healthy condition, there is relationship between the temperatures at different operating conditions of the prime mover 106 at different ambient temperature and altitude conditions. The temperature relation is continuously monitored by the controller 502 from signals received from the sensor assembly 504. When the prime mover 106 exhibits a potential issue in one of the cylinders, the temperature relation will be different and varies from a healthy prime mover 106 and the controller 502 will communicate a temperature variance signal. The temperature differential is used for the identification of the potential problem. Comparing the temperature differential at different operating conditions and altitudes aids in identifying the cylinder location containing the issue on the left bank 202 or the right bank 204 of the cylinder head 300.

The integration of altitude data from the barometric pressure sensor 510 enhances the accuracy, as changes in altitude can also influence the exhaust temperature patterns and provide additional insights into the health and performance of the prime mover 106. This real-time detection of the issues in the prime mover 106 aids in detecting the problem at an early stage to prevent potential consequential damages to the prime mover 106. Identification of the problematic bank, the left bank 202 or the right bank 204, will aid in identifying the exact location of the problematic cylinder.

Donor bank refers to a subset of cylinders within the prime mover 106 that contribute exhaust gases to the EGR system. In a donor bank EGR configuration, specific cylinders are designated to provide a portion of their exhaust gases back into the engine's intake air. These exhaust gases, which contain inert gases and particulates, are recirculated into the combustion chamber 306 to lower the combustion temperature and reduce nitrogen oxide (NOx) emissions. Donor bank cylinders are the ones from which the exhaust gases are extracted for recirculation.

Standard bank cylinders are the remaining cylinders in the engine that do not serve as part of the donor bank and operate in a traditional manner, as generally known in the arts. The exhaust gases from the standard bank cylinders are expelled from the prime mover 106, without being redirected to the EGR cooler 404 for recirculation. The prime mover 106 may be a donor bank EGR type diesel engine.

INDUSTRIAL APPLICABILITY

In operation, the present disclosure may find applicability in many industries including, but not limited to, the train, automotive, construction, earth-moving, mining, and agricultural industries. Specifically, the systems, machines, and methods of the present disclosure may be used for monitoring the health of the prime mover 106 of locomotives including, but not limited to, trains, boats, excavators, backhoes, rope shovels, skid steers, wheel loaders, tractors, and similar locomotives utilizing combustion engines. While the foregoing detailed description is made with specific reference to diesel combustion engines, it is to be understood that its teachings may also be applied onto the other engines such as gasoline combustion engines or Otter engine.

Now referring to FIG. 6, a method 600 for monitoring health status of the prime mover 106 is illustrated, according to an embodiment of the disclosure. In a step 602, the prime mover 106 is provided with the left bank 202 and the right bank 204, the EGR cooler 404 in fluid communication with a first exhaust of the prime mover 106, the turbocharger 402 in fluid communication with a second exhaust of the prime mover 106, a first temperature sensor on the first exhaust, and a second temperature sensor on the second exhaust, the controller 502 in communication with the first temperature sensor 508 and the second temperature sensor 508. The first temperature sensor and the second temperature sensor are provided as the temperature sensor 508.

In a step 604, the prime mover 106 is activated to begin operation. In a step 606, the controller 502 monitors for a temperature differential between the first temperature sensor and the second temperature sensor. In a step 608, the controller 502 identifies a temperature differential exceeding a temperature differential limit indicative of an operational issue of the prime mover 106. In a step 610, the controller 502 alerts an operator of the locomotive 100 that the controller 502 detected the operational issue and communicates an alert signal. The alert signal may be communicated to the display interface 512 in the cab 108. The alert signal may be communicated via the off-board network 514 to a back office team, as generally known in the arts.

The health monitoring system 500 may further be configured to identify operational issues in the cylinder head 300. The method 600 may further include classifying a location of the operational issue in the right bank 204 of the cylinder head 300 when the controller 502 calculates a temperature differential limit greater than a first bank threshold. The method 600 may further include classifying a location of the operational issue in the left bank 202 of the cylinder head 300 when the controller 502 calculates a temperature differential limit greater than a second bank threshold.

From the foregoing, it can be seen that the technology disclosed herein has industrial applicability in a variety of settings such as, but not limited to agricultural, construction, and mining industries that utilize locomotives and machines such as trains, marine vessels, excavators, backhoes, rope shovels, skid steers, wheel loaders, tractors, and similar machines having work implements for non-hauling operations.

What is claimed is:

1. A health monitoring system for a prime mover of a locomotive comprising:
   the prime mover having a cylinder head with a first bank and a second bank;
   an EGR cooler in fluid communication with the prime mover;
   a first exhaust of the prime mover in fluid communication with the EGR cooler;
   a turbocharger in fluid communication with the prime mover;
   a second exhaust of the prime mover in fluid communication with the turbocharger;
   a first temperature sensor provided on the first exhaust and a second temperature sensor provided on the second exhaust;
   a barometric pressure sensor provided on the prime mover;
   a controller in communication with the first temperature sensor, the second temperature sensor, and the barometric pressure sensor, the controller configured to:
      monitor a temperature relationship between the first temperature sensor and the second temperature sensor in real time at varying altitudes and atmospheres;
      detect instances of temperature differentials of the temperature relationship during operation of the prime mover; and
      identify a crack formation in the prime mover when instances of temperature differentials exceeds a temperature differential limit.

2. The health monitoring system of claim 1, the controller further configured to:
   compare the instances of temperature differentials at the varying altitudes and atmospheres; and
   identify a location of the crack formation in the prime mover at which instances of temperature differentials exceeds the temperature differential limit.

3. The health monitoring system of claim 1, further comprising the controller connected to an off-board network and mobile remote, the mobile remote configured to activate and deactivate the prime mover in response to a crack alert associated with the prime mover.

4. The health monitoring system of claim 1, further comprises a display interface for displaying alerts including a crack alert received from the controller.

5. The health monitoring system of claim 1, wherein the prime mover is a donor bank EGR diesel engine.

6. The health monitoring system of claim 1, wherein the first temperature sensor and the second temperature sensor are provided as a plurality of thermocouples having fast sampling data and positioned in the first bank and the second bank of the cylinder head.

7. A locomotive comprising:
   a frame;
   a prime mover mounted on the frame;
   a ground engaging element supporting the frame;
   a cab;
   a turbocharger
   the prime mover having a cylinder head with a first bank and a second bank;
   an EGR cooler in fluid communication with the prime mover;
   a first exhaust of the prime mover in fluid communication with the EGR cooler;
   the turbocharger in fluid communication with the prime mover;
   a second exhaust of the prime mover in fluid communication with the turbocharger; and
   a health monitoring system including:
      a first temperature sensor provided on the first exhaust and a second temperature sensor provided on the second exhaust;
      a barometric pressure sensor provided on the prime mover;
      a controller in communication with the first temperature sensor, the second temperature sensor, and the barometric pressure sensor, the controller configured to:
         monitor a temperature relationship between the first temperature sensor and the second temperature sensor in real time at varying altitudes and atmospheres;
         detect instances of temperature differentials of the temperature relationship during operation of the prime mover; and
         identify a crack formation in the cylinder head when instances of temperature differentials exceeds a temperature differential limit in the cylinder head.

8. The locomotive of claim 7, the controller further configured to:
   compare the temperature differentials monitored via the first temperature sensor and the second temperature sensor at the varying altitudes and atmospheres; and
   identify a location of the crack formation in a particular cylinder head at which instances of temperature differentials exceeds the temperature differential limit.

9. The locomotive of claim 7, wherein
   the controller is further configured to communicate a crack alert associated with the crack formation in the cylinder head to a display interface; and
   the controller is connected to an off-board network and mobile remote, the mobile remote configured to activate and deactivate the prime mover in response to a crack alert associated with the crack formation in the cylinder head.

10. The locomotive of claim 7, further comprises a display interface for displaying alerts including a cylinder head crack alert received from the controller.

11. The locomotive of claim 7, wherein the prime mover is a donor bank EGR diesel engine.

12. The locomotive of claim 7, wherein the locomotive is a train or marine vessel.

13. The locomotive of claim 7, wherein the first temperature sensor and the second temperature sensor are provided as a plurality of thermocouples having fast sampling data and positioned in the first bank and the second bank of the cylinder head.

14. A method for monitoring the health status of a prime mover of a locomotive, the method comprising:

providing the prime mover with a left bank and a right bank, an EGR cooler in fluid communication with a first exhaust of the prime mover, a turbocharger in fluid communication with a second exhaust of the prime mover, a first temperature sensor on the first exhaust, and a second temperature sensor on the second exhaust, a controller in communication with the first temperature sensor and the second temperature sensor;

operating the prime mover;

monitoring, via the controller, a differential between the first temperature sensor and the second temperature sensor;

identifying the differential exceeding a threshold; and alerting an existence of a prime mover crack, via communicating an alert signal by the controller.

15. The method of claim 14, further comprising:

classifying a location of the prime mover crack in the right bank of a cylinder head when the controller calculates the differential greater than a first bank threshold; and classifying the location of the prime mover crack in the left bank of the cylinder head when the controller calculates a differential greater than a second bank threshold.

16. The method of claim 15, further comprising:

providing a barometric pressure sensor on the locomotive; and identifying the differential at varying altitudes.

17. The method of claim 16, further comprising:

providing an off-board network connected to the controller;

alerting a back-office in communication with the off-board network; and controlling the locomotive with a remote connected to the off-board network.

18. The method of claim 17, further comprises:

displaying the alert signal of the prime mover crack received from the controller on a display interface in a cab of the locomotive.

19. The method of claim 18, further comprises:

providing a donor bank EGR diesel engine as the prime mover.

20. The method of claim 19, further comprises:

providing the first temperature sensor and the second temperature sensor as a plurality of thermocouples in the left bank and the right bank of the cylinder head, the plurality of thermocouples having fast sampling data and positioned.

* * * * *